(12) United States Patent
Fitzwater et al.

(10) Patent No.: US 10,392,042 B2
(45) Date of Patent: *Aug. 27, 2019

(54) FOLDABLE WAGON

(71) Applicant: RADIO FLYER INC., Chicago, IL (US)

(72) Inventors: Jason Fitzwater, Chicago, IL (US); Cameron Eckert, Chicago, IL (US); Michael Boyle, LaGrange, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/139,329

(22) Filed: Sep. 24, 2018

(65) Prior Publication Data

US 2019/0023300 A1 Jan. 24, 2019

Related U.S. Application Data

(63) Continuation of application No. 15/210,413, filed on Jul. 14, 2016, now Pat. No. 10,081,380.

(60) Provisional application No. 62/193,181, filed on Jul. 16, 2015, provisional application No. 62/234,368, filed on Sep. 29, 2015.

(51) Int. Cl.
*B62B 3/02* (2006.01)
*B62B 3/00* (2006.01)

(52) U.S. Cl.
CPC .............. *B62B 3/022* (2013.01); *B62B 3/007* (2013.01); *B62B 3/02* (2013.01); *B62B 3/002* (2013.01); *B62B 2205/20* (2013.01)

(58) Field of Classification Search
CPC ........... B62B 3/022; B62B 3/002; B62B 3/02; B62B 3/007; B62B 3/025; B62B 2202/52; B62B 2205/06
See application file for complete search history.

(56) References Cited

U.S. PATENT DOCUMENTS

| | | | |
|---|---|---|---|
| 2,020,766 A | 11/1935 | Brown | |
| 6,079,777 A * | 6/2000 | Simmons | ............... A47C 1/143 108/157.17 |
| 6,491,318 B1 * | 12/2002 | Galt | .......................... B62B 3/02 280/42 |
| 7,097,182 B1 | 8/2006 | Liu | |
| 8,973,940 B2 * | 3/2015 | Chen | ......................... B62B 3/02 280/35 |
| 10,081,380 B2 * | 9/2018 | Fitzwater | ................ B62B 3/022 |
| 2004/0238469 A1 | 12/2004 | Ng | |
| 2008/0073880 A1 | 3/2008 | Bess | |
| 2015/0084298 A1 | 3/2015 | Herlitz | |

FOREIGN PATENT DOCUMENTS

CN 102166068 8/2011

* cited by examiner

*Primary Examiner* — Brian L Swenson
(74) *Attorney, Agent, or Firm* — Barnes and Thornburg LLP

(57) ABSTRACT

A foldable wagon is provided that converts from a use configuration to a folded configuration for storage and transportation. The foldable wagon has a collapsible frame, a foldable floor assembly and a linkage assembly. The foldable wagon may also have a flexible housing over a portion of the frame. The flexible housing may have a retractable sidewall.

19 Claims, 11 Drawing Sheets

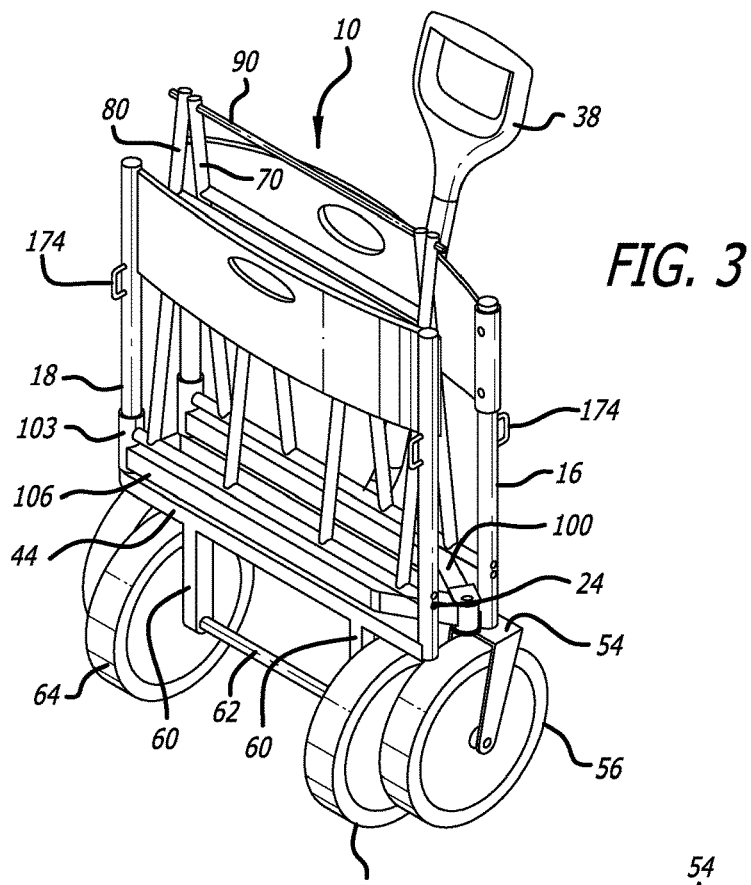
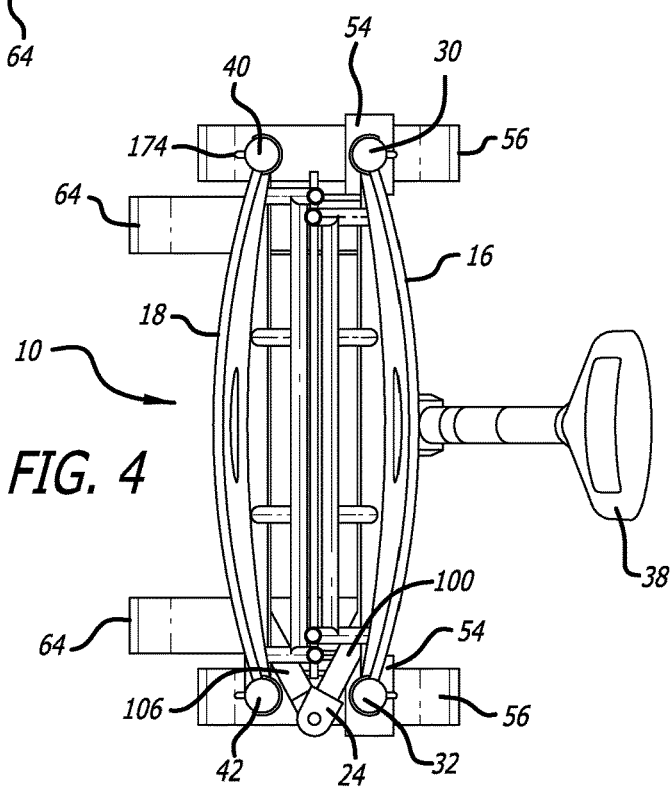

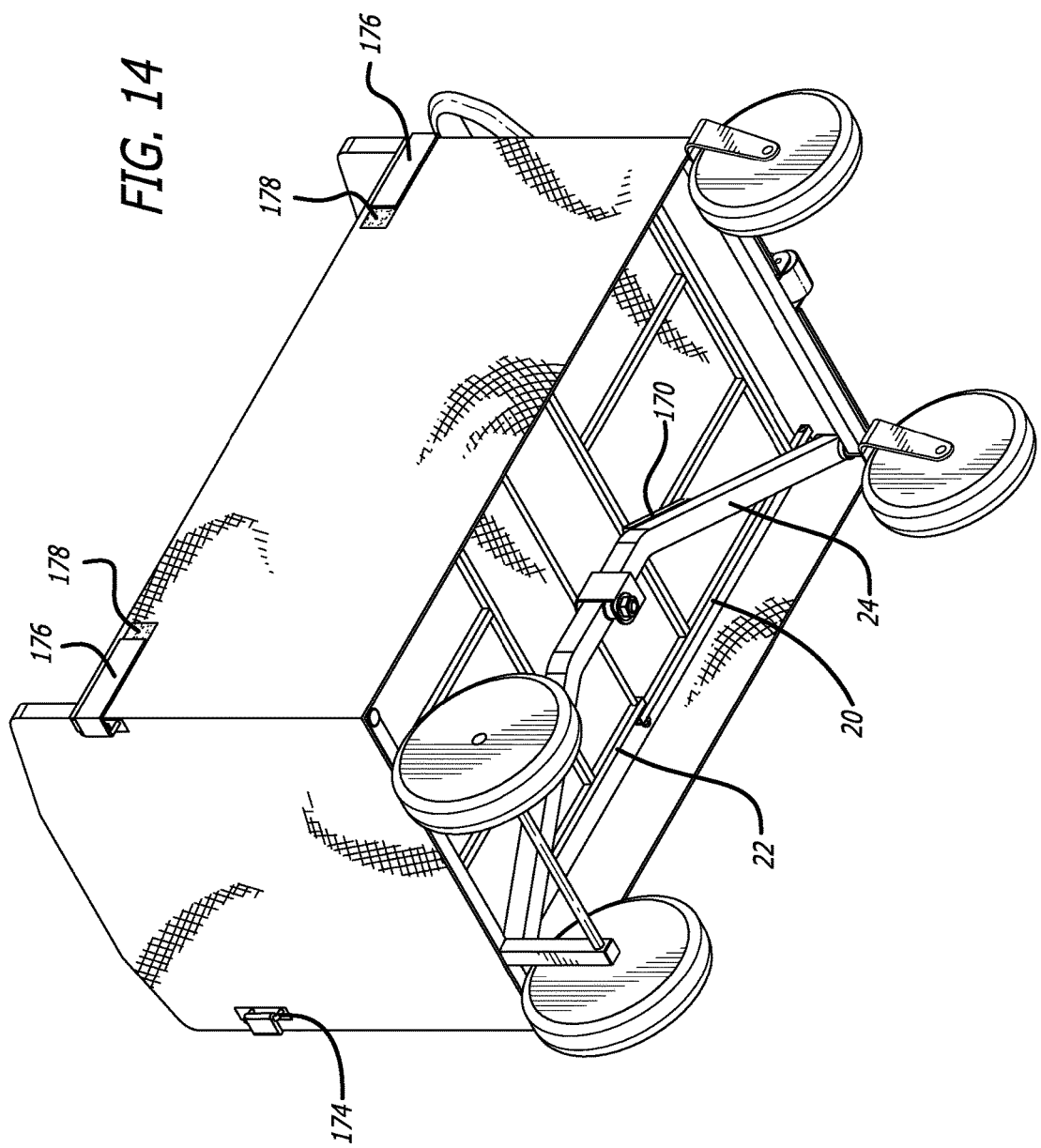

FOLDABLE WAGON

CROSS-REFERENCE TO RELATED APPLICATIONS

This application is a continuation of U.S. patent application Ser. No. 15/210,413, filed on Jul. 14, 2016, and further claims the benefit of U.S. Provisional Patent Application No. 62/193,181, filed Jul. 16, 2015, and U.S. Provisional Patent Application No. 62/234,368, filed Sep. 29, 2015, and all of which are expressly incorporated herein by reference and made a part hereof.

FEDERALLY SPONSORED RESEARCH OR DEVELOPMENT

Not Applicable.

TECHNICAL FIELD

The present disclosure relates generally to wagons, and more specifically to a foldable wagon that converts from an open or use configuration to a folded configuration for transportation or storage.

BACKGROUND

Wagons, including folding wagons, are well known in the art. While such wagons according to the prior art provide a number of advantages, they nevertheless have certain limitations, including often having complex, heavy and expensive frames. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a foldable wagon that is convertible from an open, unfolded or use position (i.e., an open configuration) to a closed or folded position (i.e., a closed configuration). In one embodiment, the foldable wagon has a collapsible frame, a floor assembly, and a linkage assembly. In alternate embodiments the foldable wagon has a flexible housing on to the collapsible frame.

The disclosed subject technology further relates to a wagon comprising: a frame having a first end assembly and an opposing second end assembly; a floor assembly comprising a first floor assembly pivotally connected to the first end assembly, and a second floor assembly pivotally connected to the second end assembly, the first floor assembly pivotally connected to the second floor assembly; a linkage assembly connected to the first end assembly and the second end assembly, the linkage assembly having a first linkage pivotally connected to the first end assembly, a second linkage pivotally connected to the second end assembly, and wherein the first linkage is also pivotally connected to the second linkage; and, a flexible housing over a portion of the frame.

The disclosed subject technology further relates to a foldable wagon where the frame of the foldable wagon does not comprise a sidewall in a plane perpendicular to the floor assembly.

The disclosed subject technology further relates to a front wheel assembly connected to the first end assembly, and a rear wheel assembly connected to the second end assembly.

The disclosed subject technology further relates to a foldable wagon that has a first end assembly comprising first and second vertical members, and a second end assembly comprising first and second vertical members.

The disclosed subject technology further relates to a floor assembly that moves in a first plane during conversion of the frame from the open configuration to the folded configuration, a linkage assembly that moves in a second plane during conversion of the frame from the open configuration to the folded configuration, and wherein the first and second planes are perpendicular.

The disclosed subject technology further relates to a center brace pivotally connecting the first floor assembly and the second floor assembly.

The disclosed subject technology further relates to a foldable wagon having a linkage assembly that comprises a two bar linkage. In alternate embodiments the linkage assembly is v-shaped. In alternate embodiments the linkage assembly is positioned below the floor assembly in both the open configuration and the folded configuration.

The disclosed subject technology further relates to a receiver extending from the linkage assembly, the receiver releasably engaging the floor assembly.

The disclosed subject technology further relates to a flexible housing on a portion of the frame. In one embodiment the flexible housing has a first sidewall, a second sidewall, a first end wall and a second end wall. The first sidewall, second sidewall, first end wall and second end wall form a wagon enclosure, and wherein the first sidewall is retractable, openable or lowerable. In an alternate embodiment the second sidewall is retractable, openable or lowerable.

The disclosed subject technology further relates to a foldable wagon, comprising: a frame having a first end assembly, an opposing second end assembly, and a floor assembly, the frame converting from an open configuration to a folded configuration; a linkage assembly pivotally connecting the first end assembly to the second end assembly in both the open configuration and the folded configuration; and, a housing over a portion of the frame, wherein the housing has a first sidewall, a second sidewall, a first end wall and a second end wall, the first sidewall, second sidewall, first end wall and second end wall forming a wagon enclosure, and wherein the first sidewall is retractable.

The disclosed subject technology further relates to a foldable wagon, comprising: a frame having a first end assembly, an opposing second end assembly, and a floor assembly, the frame converting from an open configuration to a folded configuration; and, a 2-bar linkage assembly pivotally connecting the first end assembly to the second end assembly in both the open configuration and the folded configuration, the linkage assembly having a first linkage pivotally connected to the first end assembly, a second linkage pivotally connected to the second end assembly, and wherein the first linkage is also pivotally connected to the second linkage.

The disclosed subject technology further relates to a foldable wagon, comprising: a frame having a first end assembly, a second end assembly opposing the first end assembly, and a floor assembly, wherein the frame converts from an open configuration to a folded configuration, and wherein the frame has a first side and a second side; and, a linkage assembly pivotally connecting the first end assembly to the second end assembly in both the open configuration and the folded configuration, the linkage assembly having a first linkage pivotally connected to the first side of the first end assembly, and a second linkage pivotally connected to the first side of the second end assembly, wherein the linkage assembly is not directly connected to the second side of the frame, and wherein the first linkage is also pivotally connected to the second linkage.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 3 is a perspective view of the foldable wagon of FIG. 1, showing the foldable wagon frame in the folded configuration.

FIG. 4 is a top view of the foldable wagon of FIG. 3, showing the foldable wagon frame in the folded configuration.

FIG. 14 is a bottom perspective view of the foldable wagon of FIG. 13.

DETAILED DESCRIPTION

Figure 1:
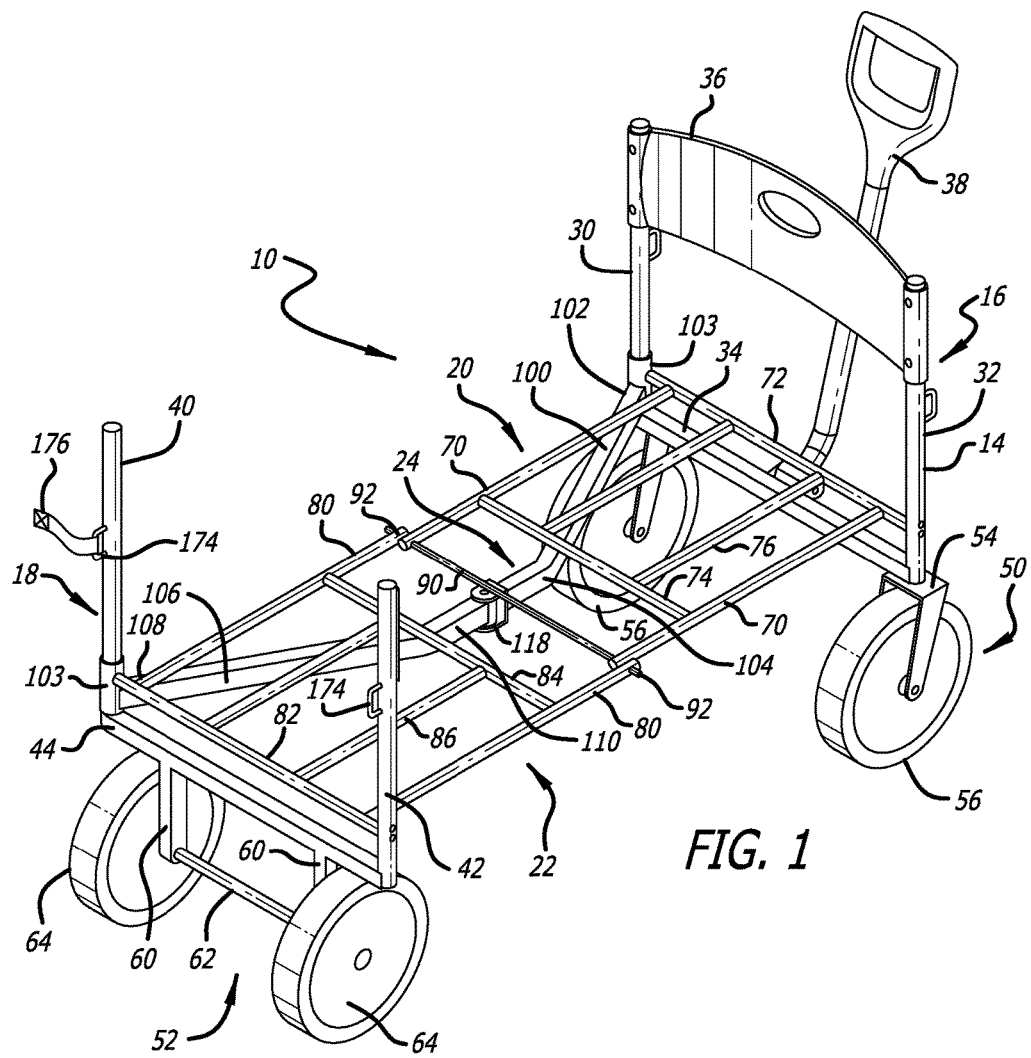
FIG. 1 is a perspective view of a foldable wagon according to one embodiment, showing the foldable wagon frame in an open, unfolded or use configuration.
Figure 2:
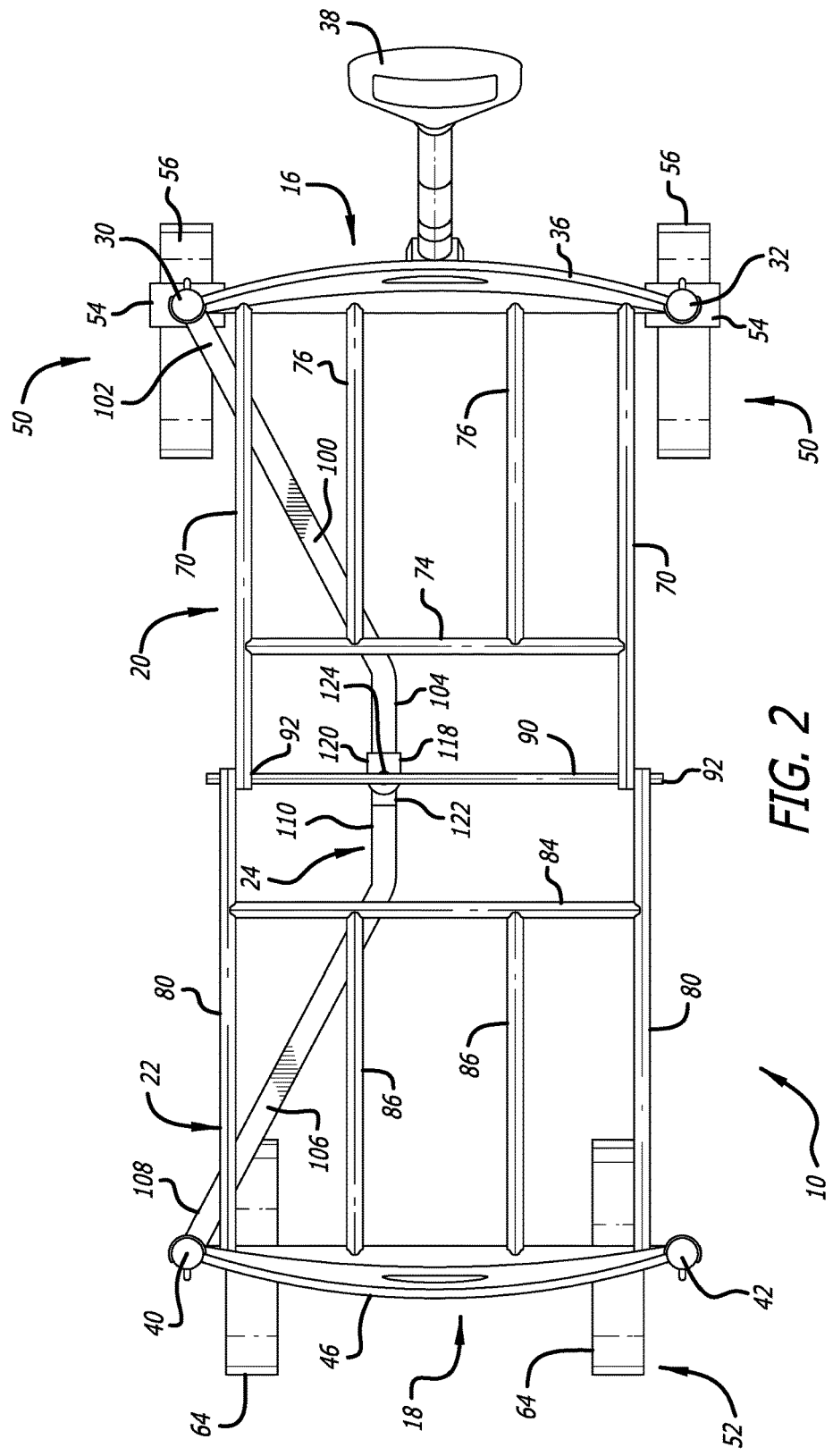
FIG. 2 is a top view of the foldable wagon of FIG. 1, with the foldable wagon frame in the open, unfolded or use configuration.

While the foldable wagon discussed herein is susceptible of embodiments in many different forms, there is shown in the drawings, and will herein be described in detail, preferred embodiments with the understanding that the present description is to be considered as an exemplification of the principles of the foldable wagon and are not intended to limit the broad aspects of the disclosure to the embodiments illustrated.

Referring now to the figures, and initially to FIGS. 1-5, in various embodiments a foldable wagon 10 includes a collapsible frame assembly 14 such that the foldable wagon 10 and collapsible frame assembly 14 are moveable between an unfolded, open or use configuration (FIGS. 1, 2, 5-6, 8-10 and 13-14) and a closed, collapsed or folded configuration (FIGS. 3 and 4). In one embodiment, the frame assembly 14 includes a first end assembly 16, an opposing second end assembly 18 opposing the first end assembly 16, a floor assembly and a linkage assembly 24. The floor assembly may comprise a first floor assembly 20 and a second floor assembly 22. The first floor assembly 20 is generally pivotally connected to and extending from the first end assembly 16, and the second floor assembly 22 is generally pivotally connected to and extending from the second end assembly 18. The linkage assembly 24 generally connects the first end assembly 16 to the second end assembly 18. Additionally, as shown in FIGS. 6-10 and 13-14, in various embodiments the foldable wagon 10 includes a flexible housing 26 connected to the foldable frame assembly 14.

The first end assembly 16 generally comprises first and second vertical members 30 and 32, connected by a front lower cross support 34 towards a bottom of the two vertical members 30 and 32. Additionally, in one embodiment, a front upper cross support 36 connects the two vertical members 30 and 32 toward a top of the vertical members 30, 32. It is understood that the front upper cross support 36 may be omitted in alternate embodiments. In the first embodiment of FIGS. 1-4, the front upper cross support 36, if used, may be a seat back 36, preferably made of a molded plastic. In the second embodiment of FIG. 5, the front upper cross support 36 may be a structural member, such as a hollow tubular or elongated solid bar member. In alternate embodiments an upper cross member 36 may not be needed. Further, in a preferred embodiment, a handle 38 is pivotally coupled to the first end assembly 16, preferably at the front lower cross member 34.

Figure 13:
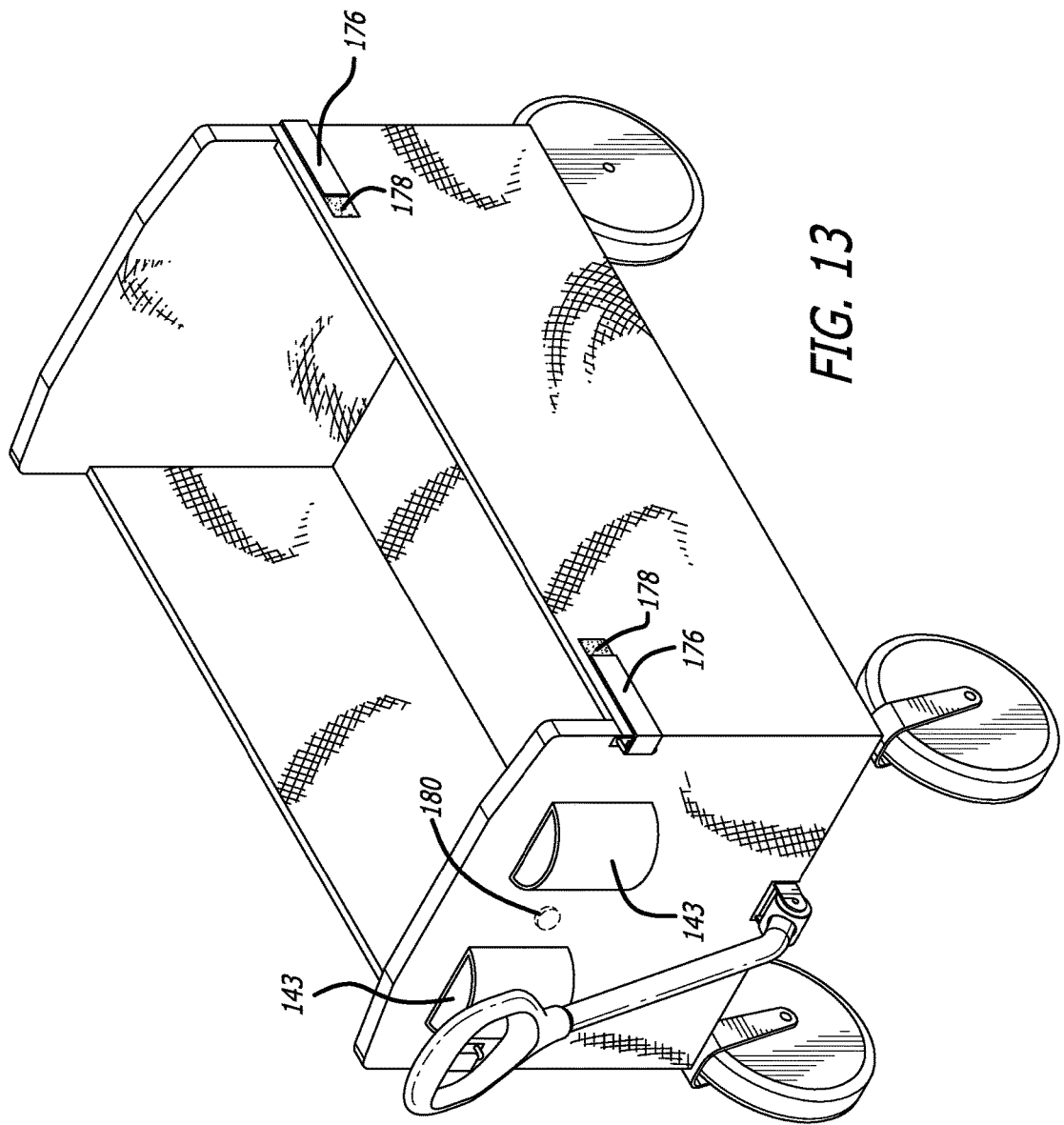
FIG. 13 is a top perspective view of an alternate embodiment of the foldable wagon.

Similarly, the second end assembly 18 generally comprises first and second vertical members 40 and 42, connected by a rear lower cross support 44 towards a bottom of the two vertical members 40 and 42. In one embodiment, a rear upper cross support 46 connects the two vertical members 40 and 42 toward a top of the vertical members 40, 42. In alternate embodiments, as shown in FIG. 1, the rear upper cross support 46 may be omitted. If used, the rear upper cross support 46 may be a seat back 46, and may preferably be made of a molded plastic. In the second embodiment of FIG. 5, the rear upper cross support 46, if provided, may be a structural member, such as a hollow tubular or elongated solid bar member. Typically, if either or both of the upper cross supports are omitted, the flexible housing 26 may functionally operate as an upper cross member or seat back as shown in FIGS. 13 and 14. For reference purposes, the frame 14 generally has a first side at the side of the frame 14 where the first vertical members 30, 40 reside (see FIG. 1), and the frame 14 generally has a second side at the side of the frame 14 where the second vertical members 32, 42 reside (see FIG. 1).

In various embodiments, the foldable wagon 10 includes at least one front wheel assembly 50 and a rear wheel assembly 52. In one embodiment the front wheel assembly 50 is connected to the first end assembly 16. The front wheel assembly 50 preferably comprises, in one embodiment, a caster assembly. In one embodiment, a wheel support 54 of the front wheel assembly 50 is pivotally connected to the first end assembly 16 to allow the wagon 10 to turn when pulled by a user. The front wheel support 54 is configured to support a front wheel 56 rotatedly mounted upon an axle assembly of the front wheel assembly 50. In one embodiment the foldable wagon 10 includes two front wheel assemblies 50 that are caster assemblies to assist in steering of the wagon 10. In an alternate embodiment, not shown, the front wheel assemblies 50 are comprised of single-sided bent wire casters. Alternately, the front wheel assembly 50 may not be turnable to steer the wagon, similar to the rear wheel assembly 52.

Figure 5:
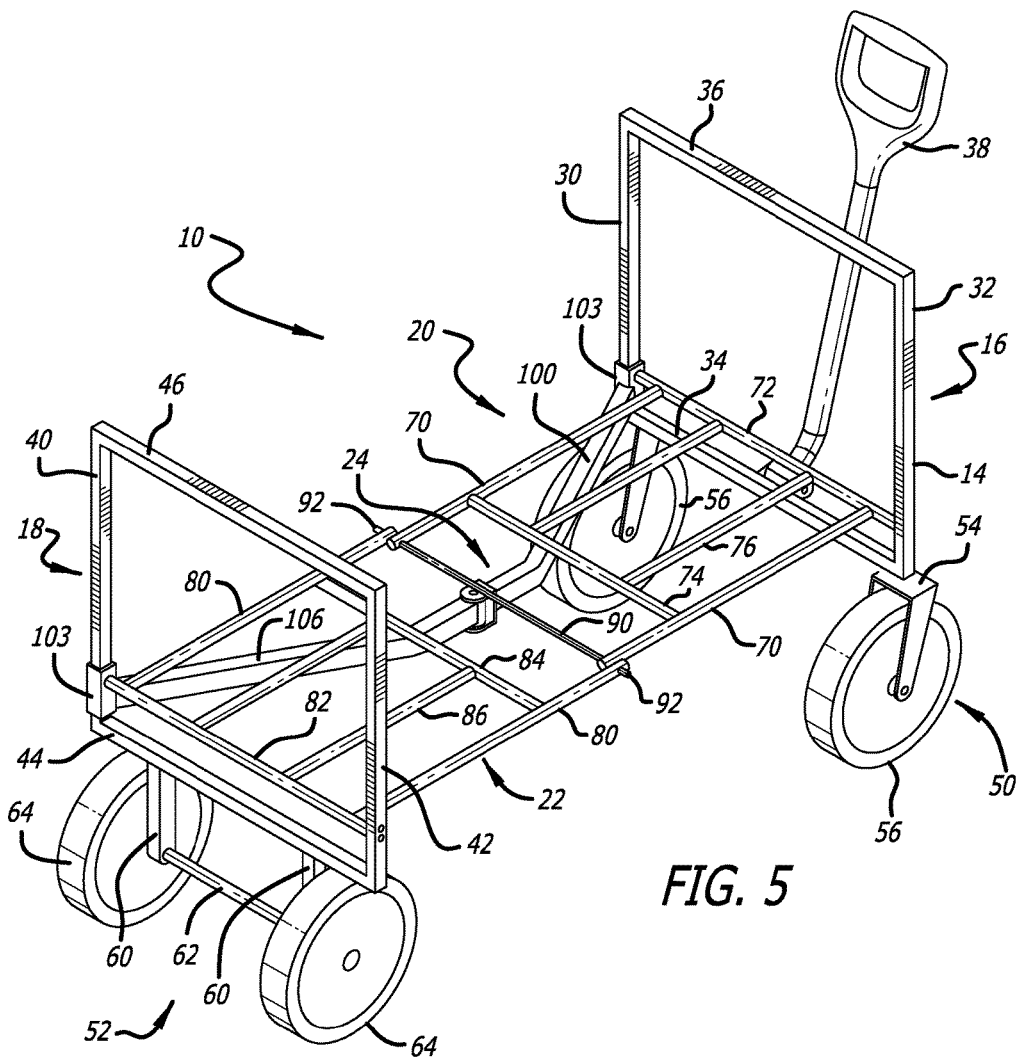
FIG. 5 is a perspective view of a foldable wagon according to a second embodiment, showing the foldable wagon frame in an open, unfolded or use configuration.

Referring to FIGS. 1 and 5, in various embodiments, the rear wheel assembly 52 is connected to the second end assembly 18. A pair of downwardly extending rear wheel supports 60 extend downwardly from the rear lower cross support 44. The rear wheel supports 60 rotatedly support the rear wheel assembly 52. In one embodiment, the rear wheel assembly 52 comprises a rear axle 62 and a pair of rear wheels 64. The rear axle 62 may extend between and through the rear wheel supports 60 to rotatably support the rear wheels 64. As best shown in FIGS. 3 and 4, the front wheels 56 are outboard of the rear wheels 64, thereby providing greater stability for the wagon 10. Additionally, because the front wheels 56 are outboard of the rear wheels 64, the rear wheels 64 can be connected to a solid rear axle 62 and still avoid the front wheels 56 during folding of the wagon 10. Alternately, however, separate rear wheel axles may be connected to each rear wheel support 60 to separately rotatedly support the individual rear wheels 64.

As shown in FIGS. 1-5, the first floor assembly 20 of the various embodiments is pivotally connected to and extends from the first end assembly 16. The first floor assembly 20 generally comprises two side members 70, a first end member 72, a second end member 74, and a plurality of central support members 76. In one embodiment the first end member 72 is pivotally connected between the two vertical members 30, 32 of the first end assembly 16. Shoulder bolts or other rotatable fastening mechanisms may be used to pivotally connect the first end member 72 between and to the two vertical members 30, 32 of the first end assembly 16. The two side members 70 are preferably fixed adjacent opposing ends of the first end member 72 and extend toward a center of the floor of the wagon 10. The second end member 74 and a plurality of central support members 76 are utilized to provide rigidity to the first floor assembly 20. In an alternate embodiment, not shown, the side members 70 extend to the vertical members 30, 32, respectively, and are pivotally connected to the respective vertical member 30, 32. Then, the first end member 72 is connected between the side members 70 instead of being connected to the vertical members 30, 32.

Similarly, the second floor assembly 22 of the various embodiments is pivotally connected to and extends from the second end assembly 18. The second floor assembly 22 generally comprises two side members 80, a first end member 82, a second end member 84, and a plurality of central support members 86. In one embodiment the first end member 82 is pivotally connected between the two vertical members 40, 42 of the second end assembly 18. Shoulder bolts or other rotatable fastening mechanisms may be used to pivotally connect the first end member 82 between and to the two vertical members 40, 42 of the second end assembly 18. The two side members 80 are preferably fixed adjacent opposing ends of the second end member 82 and extend toward a center of the floor of the wagon 10. The second end member 84 and a plurality of central support members 86 are utilized to provide rigidity to the second floor assembly 22. In one embodiment, floor panels (not shown) may be secured to a top of the floor assemblies 20, 22 to provide a base or floor for the wagon 10, on which the flexible housing 26 may rest. In an alternate embodiment, not shown, the side members 80 extend to the vertical members 40, 42, respectively, and are pivotally connected to the respective vertical member 40, 42. Then, the first end member 82 is connected between the side members 80 instead of being connected to the vertical members 40, 42.

The first and second floor assemblies 20, 22 are connected at a center brace 90. Preferably, the center brace 90 is pivotally connected to the first floor assembly 20 and the second floor assembly 22 to allow the first floor assembly 20 to be pivotally connected to the second floor assembly 22. In one embodiment, the center brace 90 is an elongated member, such as a round or other shaped tube or solid member, that extends to connect each of the side members 70 and 80 of the first and second floor assemblies 20, 22 thereto. In a preferred embodiment, each of the side members 70 and 80 of the first and second floor assemblies 20, 22 has a lateral opening 92 toward its end adjacent a center of the wagon 10. The lateral openings 92 preferably have an axis that is transverse to a longitudinal axis of each of the side members 70, 80. The center brace 90 extends through the lateral openings 92 in each of the four side members 70, 80 to pivotally connect the first and second floor assemblies 20, 22. Additionally, in a preferred embodiment, the width of the first floor assembly 20 is less than the width of the second floor assembly 22, to allow for the side members 70 of the first floor assembly 20 to be interior but adjacent the side members 80 of the second floor assembly 20 for clearance purposes. The opposite configuration may also be provided. The first and second floor assemblies 20, 22 define the floor of the wagon 10. The floor assembly generally moves in a first plane to transition from the open or unfolded configuration (FIG. 1) to the closed or folded configuration (FIG. 3).

As best shown in FIGS. 1-5, in one embodiment the linkage assembly 24 connects the first end assembly 16 to the second end assembly 18, and provides rigidity to the wagon in both the open and closed configurations, but also allows the wagon 10 to be collapsed or folded such that the first end assembly 16 and second end assembly 18 are adjacent one another (see FIGS. 3 and 4). In one embodiment, the linkage assembly 24 is connected to the first end assembly and the second end assembly at the first side of the frame 14, and the linkage assembly 24 is not directly connected to the second side of the frame 14. The linkage assembly 24 preferably pivotally connects the first end assembly 16 to the second end assembly 18 in both the open configuration and the folded configuration. In one embodiment the linkage assembly 24 comprises a first linkage 100 and a second linkage 106. Further, in one embodiment the linkage assembly 24 is positioned below the floor assemblies 20, 22 in the open configuration and in the folded configuration of the frame. The first linkage 100 has a first end 102 and a second end 104. The first end 102 of the first linkage 100 is pivotally connected to the first end assembly 16. The second linkage 106 has a first end 108 and a second end 110. The first end 108 of the second linkage 106 is pivotally connected to the second end assembly 18. Additionally, the first linkage 100 is pivotally connected to the second linkage 106. In one embodiment, the linkage assembly 24 is preferably v-shaped.

In one embodiment, the first end 102 of the first linkage 100 has an opening with an outer housing 103 that fits around the first end assembly 16 to pivotally secure the first linkage 100 to the first end assembly 16. In a preferred embodiment, the outer housing 103 at the first end 102 of the first linkage 100 may be a tubular member that is pivotally fitted around one of the vertical members 30 of the first end assembly 16, with bushings and/or bearings therebetween to provide for easier rotation/pivoting of the first linkage 100 about the first end assembly 16. Similarly, the first end 108 of the second linkage 106 has an opening with an outer housing 103 that fits around the second end assembly 18 to pivotally secure the second linkage 106 to the second end assembly 18. In a preferred embodiment, the outer housing 103 at the first end 108 of the second linkage 106 may be a tubular member that is pivotally fitted around one of the vertical members 40 of the second end assembly 18, with bushings and/or bearings therebetween to provide for easier rotation/pivoting of the second linkage 106 about the second end assembly 18. Preferably, the outer housing 103, which in a preferred embodiment, is a generally tubular or cylindrical structure, has an extended length to provide additional rigidity to the frame assembly 14 of the wagon 10.

Further, in one embodiment the second end 104 of the first linkage 100 is pivotally connected to the second end 110 of the second linkage 106. In one embodiment the pivot connection 118 between the first linkage 100 and the second linkage 106 is that of a clevis and tang orientation. For example, one of second end 104 of the first linkage 100 or the second end 110 of the second linkage 106 has a clevis 120, and the other of the second end 104 of the first linkage 100 or the second end 110 of the second linkage 106 has a tang 122 that fits within the clevis 120. A pin 124 joins the clevis 120 and tang 122, and allows the first linkage 100 and the second linkage 106 to pivot with respect to one another during opening and closing of the wagon 10. The first linkage 100 and the second linkage 106 form a two-bar linkage to assist in keeping the first end assembly 16 secured to the second end assembly 18 in both the open configuration and the collapsed configuration, as well as in the transition between the open and collapsed configuration. Further, in a preferred embodiment, the first linkage 100 and the second linkage 106 each have a first section 130 that extends at an angle to the first and second end assemblies 16, 18, and a second section 132 that extends generally parallel to the longitudinal axis of the wagon 10. The second sections 132 meet at the pivot connection 118 between the first and second linkages 100, 106. The linkage assembly 24 generally moves in a second plane to transition from the open configuration shown in FIG. 1 to the folded configuration shown in FIG. 3. With reference to the plane of movement of the floor assembly, which moves in the first plane, the second plane of movement of the linkage assembly 24 is generally perpendicular to the first plane of movement of the floor assembly. Put another way, the floor assembly moves in a first plane, the linkage assembly moves in a second plane, and the first and second planes are perpendicular.

Figure 7:
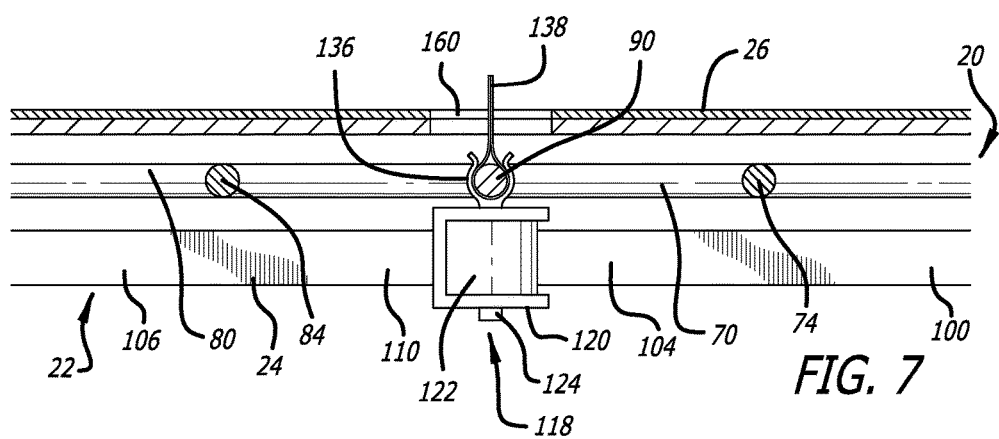
FIG. 7 is a partial cross-sectional view about lines 7-7 in FIG. 6.
Figure 10:
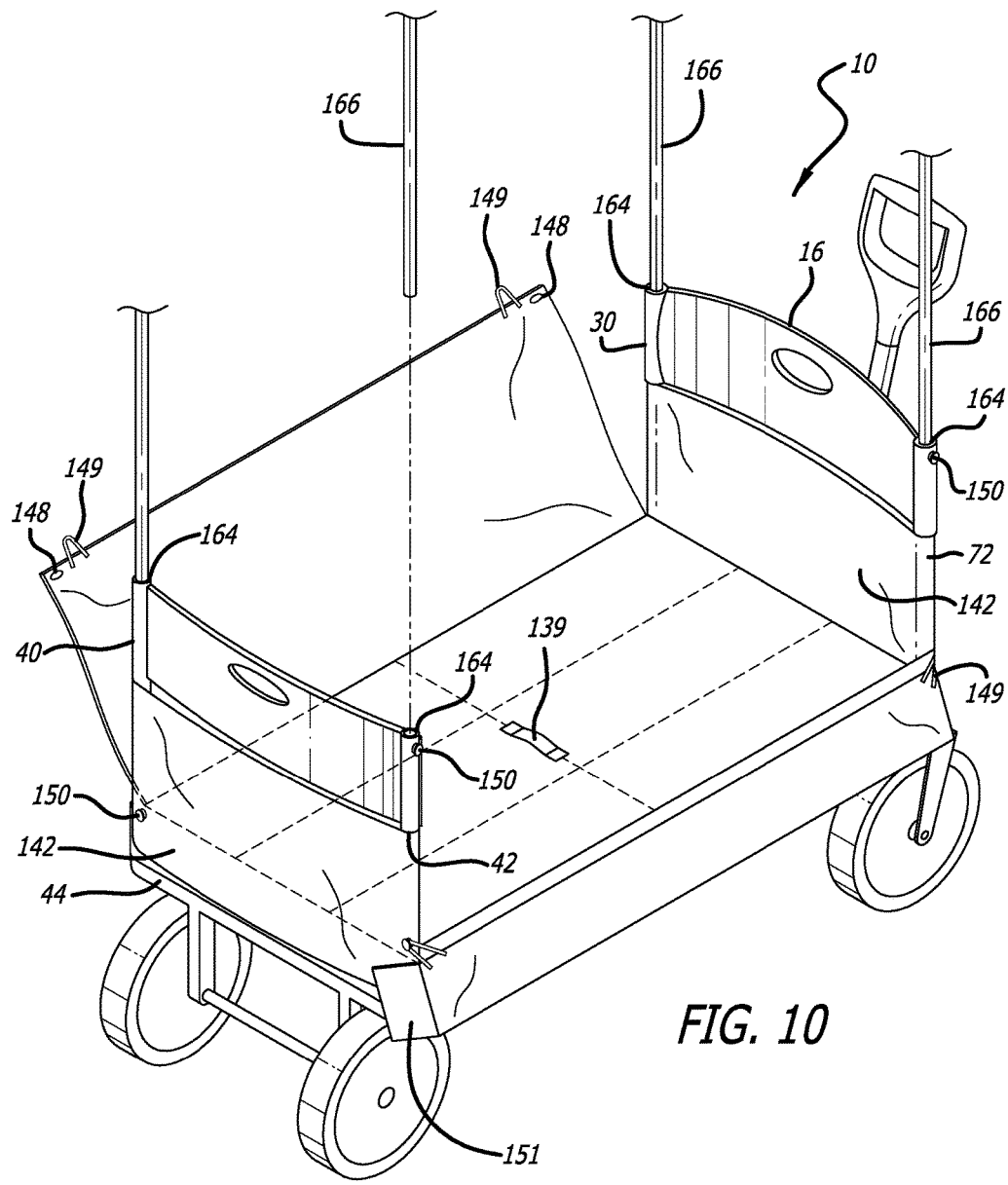
FIG. 10 is a perspective view of an alternate embodiment of the foldable wagon of FIG. 5, with the foldable wagon frame in the open, unfolded or use configuration and with a flexible housing connected to the foldable frame.
Figure 11:
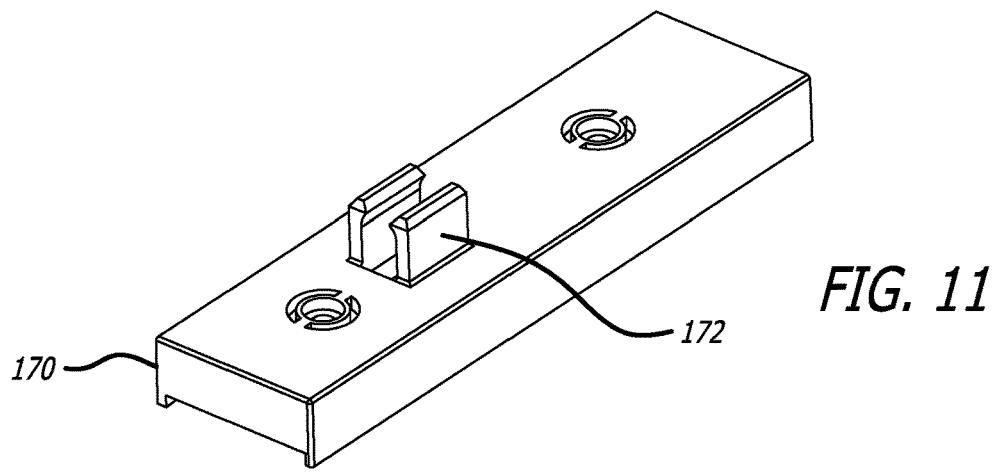
FIG. 11 is a perspective view of the retaining bracket for a foldable wagon frame.
Figure 12:
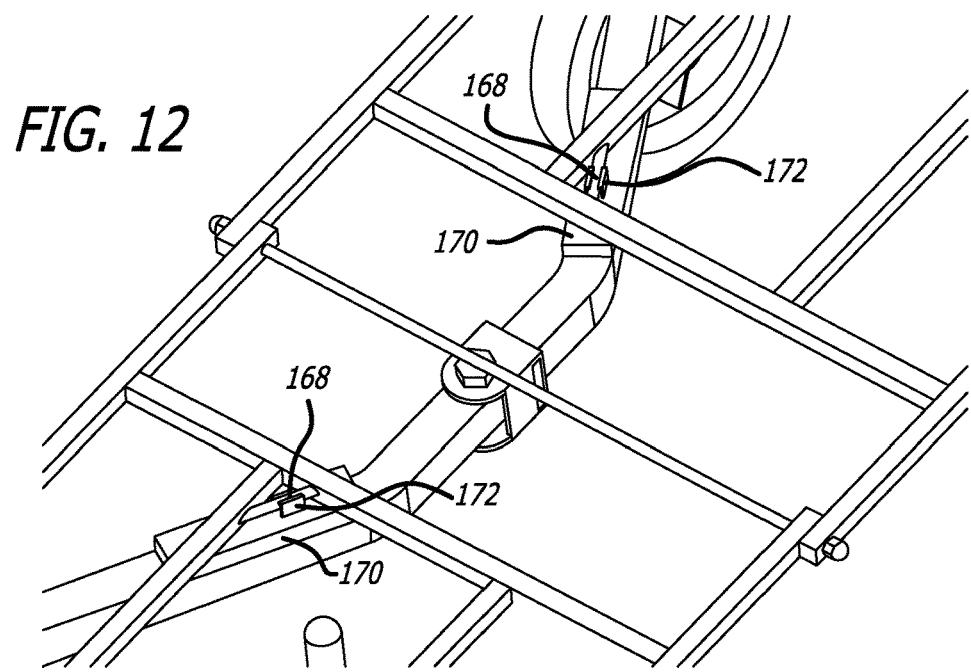
FIG. 12 is a partial perspective view of an alternate embodiment of a retaining mechanism for retaining the floor assemblies in the open position using the retaining bracket of FIG. 11.

Further, as shown in FIG. 7, in one embodiment the linkage assembly 24 may have a central clamp member or receiver 136 that engages the center brace 90 to retain the first and second floor assemblies 20, 22 in the lower position until a sufficient force is applied to lift the floor assemblies 20, 22 and disengage the center brace 90 from the central clamp member 136. Accordingly, the receiver 136 extends from the linkage assembly 24 and releasably engages the floor assembly. A tab 138, such as a fabric pull tab, may be connected to the center brace 90 to allow a user to pull the center brace 90 out of engagement with the central clamp member 136 to begin collapsing/folding of the wagon 10. In an alternate embodiment, as shown in FIGS. 10-12, one of more receiving blocks 170 may be connected to the linkage assembly 24. As shown in FIG. 11, a first receiving block 170 is connected to the first linkage 100 under the first floor assembly 20, and a second receiving block 170 is connected to the second linkage 102 under the second floor assembly 22. Further, in one embodiment each of the receiving blocks 170 has a receiver 172, similar to the central clamp member 136, to receive a brace 168 of the respective floor assemblies 20, 22. As shown in FIG. 11, the snap receiver 172 of the first receiving block 170 removably engages the brace 168 of the first floor assembly 20, and the receiver 172 of the second receiving block 170 removably engages the brace 168 of the second floor assembly 22. While in this embodiment both receiving blocks 170 include receivers 172, it is understood that only one receiving block 170 is required to have a receiver 172 to adequately secure the floor assemblies 20, 22 in the open position. However, two receiving blocks 170 are preferred as each receiving block 170 assists in providing an increased surface area to absorb forces from the first and second floor assemblies 20, 22, respectively, when the floor assemblies 20, 22 are dropped into position.

In one embodiment, a force of at least 10 lbs. is required to disengage the center brace 90 from the central clamp member 136, or the brace(s) 168 from the snap receiver(s) 172, depending on the embodiment utilized. In that manner the floor assemblies 20, 22 should not become unintentionally disengaged from the central clamp member 136 or snap receiver(s) 172 and the wagon 10 will remain in the opened configuration unless intentionally manipulated to set it in motion to convert to the folded configuration.

In a preferred embodiment, the first and second floor assemblies 20, 22 may tilt or slope slightly downwardly and inwardly from the first and second end assemblies 16, 18 respectively, such as approximately 1° to 5°, to create an over-center locking mechanism to retain the first and second floor assemblies 20, 22 in the open position until intentionally moved therefrom. Accordingly, in such an embodiment the first floor assembly slopes downwardly from the first end assembly at an angle greater than 90° from the first end assembly, and the second floor assembly slopes downwardly from the second end assembly at an angle greater than 90° from the second end assembly.

Figure 6:
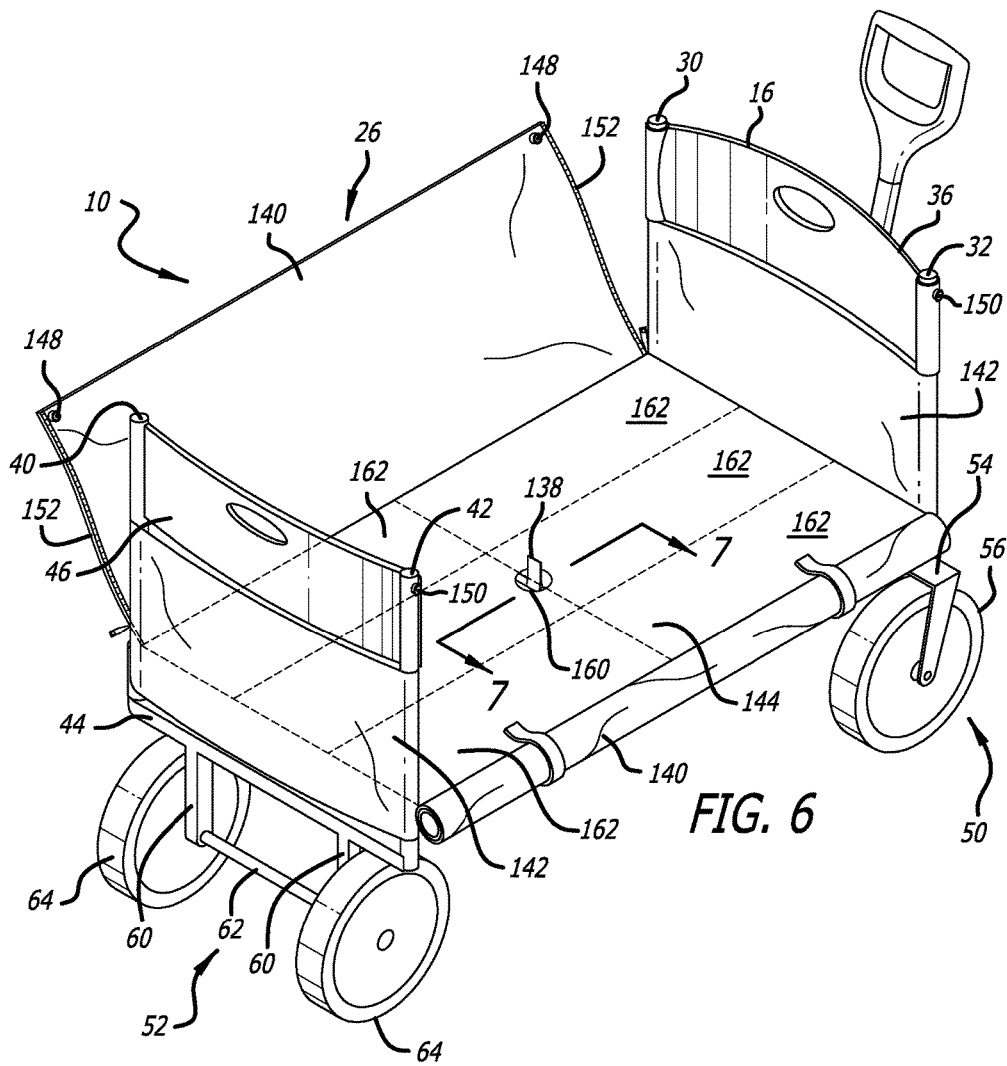
FIG. 6 is a perspective view of the foldable wagon of FIG. 1, with the foldable wagon frame in the open, unfolded or use configuration and with a flexible housing connected to the foldable frame.
Figure 8:
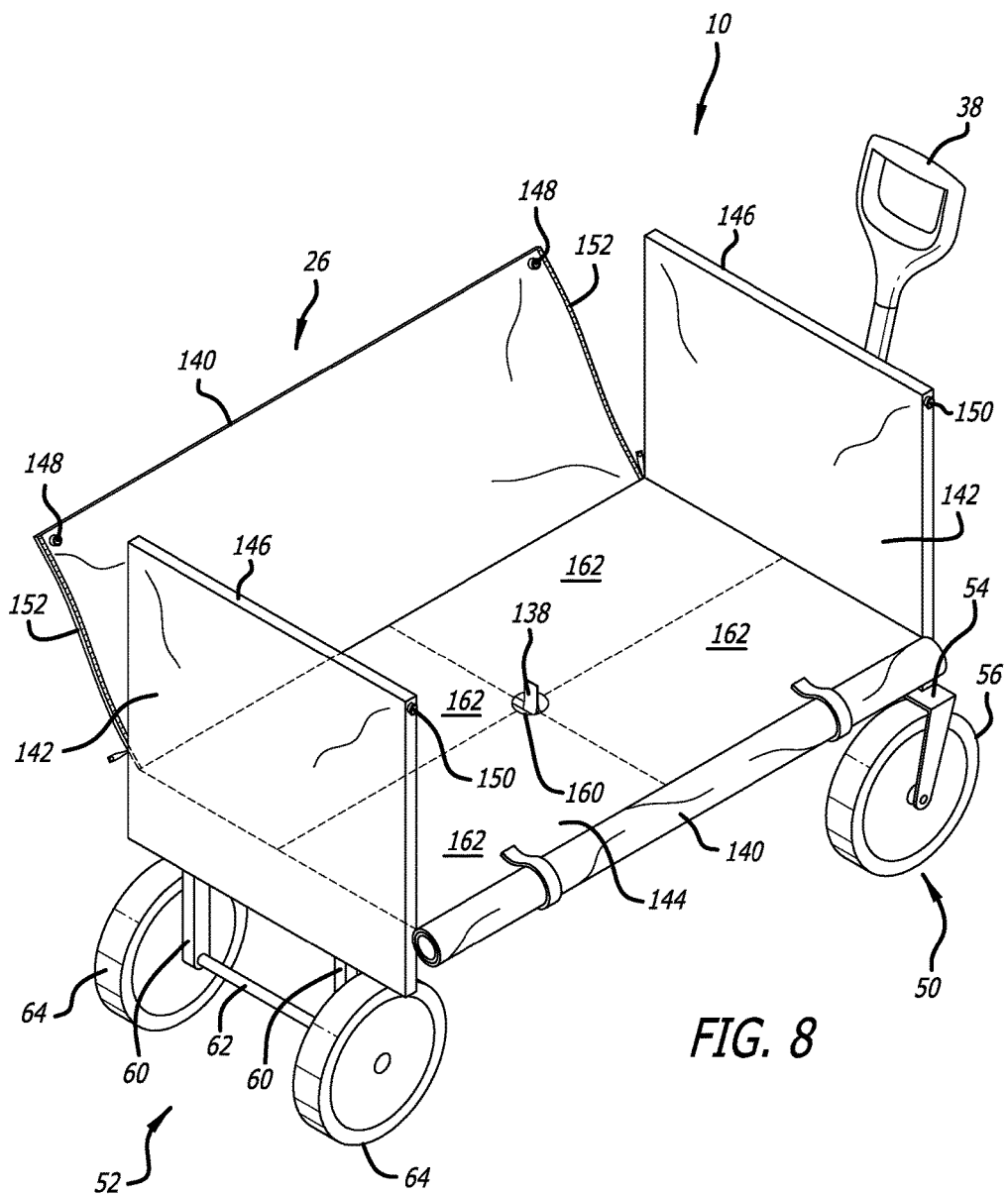
FIG. 8 is a perspective view of the foldable wagon of FIG. 5, with the foldable wagon frame in the open, unfolded or use configuration and with a flexible housing connected to the foldable frame.

In one embodiment, the wagon 10 also includes a housing assembly 26 that defines sidewalls and preferably a bottom or floor of the wagon 10. In a preferred embodiment, the housing assembly 26 is made of fabric or other flexible material, and is referred to as the flexible housing 26. The flexible housing 26 may be provided over a portion of the frame 14. As shown in FIGS. 6 and 8, the flexible housing 26 preferably includes side portions or sidewalls 140, end portions or end walls 142 and a bottom wall 144 or floor 144. Preferably, the housing 26 has a first sidewall 140 and a second sidewall 140, and a first end wall 142 and a second end wall 142. The first sidewall, second sidewall, first end wall and second end wall form a wagon enclosure. The housing assembly 26 also may include tabs that connect the housing assembly 26 to the wagon frame 14. In one embodiment, as shown in FIG. 1, the frame 14 of the foldable wagon 10 does not comprise or have a rigid sidewall in a plane perpendicular to the floor assembly in the open configuration. That is because in such embodiment the housing 26 provides the sidewall feature.

In various embodiments, as shown in FIGS. 6, 9-10 and 13-14, the housing assembly 26 is provided in connection with a wagon frame 14. In certain embodiments the housing assembly 26 includes rigid seat backs 36, 46 at each of the first and second end assemblies 16, 18, whereas in alternate embodiments rigid seat backs 36, 46 are not part of the housing assembly 26 and the seat backs are created by the flexible housing 26. The end portions 142 of the housing assembly 26 may have sleeves that extend around the first and second end assemblies 16, 18, with an open end to allow the seat backs 36 to be visible. Alternately, the sleeve aspect of the end portions 142 may extend over the seat backs 36 and may even have a closed top end 146, such as shown in the assembly of FIGS. 8 and 13-14.

Figure 9:
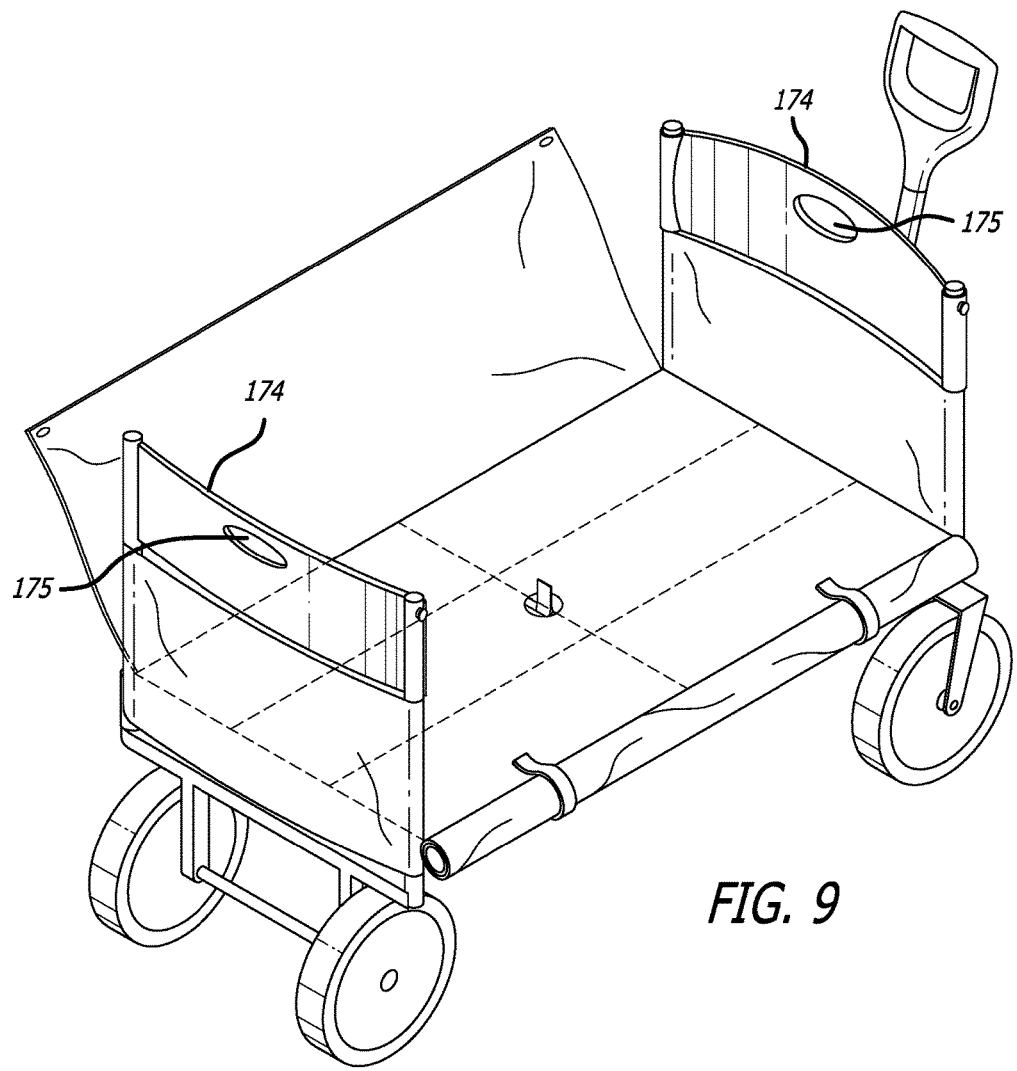
FIG. 9 is a perspective view of an alternate embodiment of the foldable wagon of FIG. 5, with the foldable wagon frame in the open, unfolded or use configuration and with a flexible housing connected to the foldable frame.

In a preferred embodiment one or more of the sidewalls 140 may be independently and separably openable to provide either a raised sidewall or they can be lowered or retracted to provide access through the side of the wagon 10. In one embodiment only one of the sidewalls 140 is retractable, whereas the other sidewall 140 is fixed to the end portions 142. In an alternate embodiment, both sidewalls may be retractable. In one embodiment any of the retractable sidewalls 140 have a fastener 148 at a top that engages a mating member 150 to hold the sidewall 140 in place. In one embodiment the fasteners 148 and mating member 150 may be a snap fastener or other removably fixing member, or alternately the fastener 148 may be an opening that engages a protrusion. In an alternate embodiment, such as shown in FIGS. 9 and 10, the mating members 150 may be a button-like member and the fasteners 148 may be a reinforced button hole. As shown in FIGS. 13-14, in a further embodiment the fastener 148 is a Velcro strip, such as fastener 176 that attaches to a mating member 150, such as a mating Velcro strip 178. In one embodiment, the Velcro strip fastener 176 is connected to a tab 174 extending from the vertical members 30, 32, 40, 42 (see FIGS. 1-4 and 13-14). Further, a zipper 152, buttons, or other fastener, etc. may be provided to secure the sides of the sidewall 140 to the side of the end portion 142 to create a joint therebetween. Additionally, any retractable sidewall 140 may be lowered or retracted and gathered together, such as shown in FIGS. 6 and 9, including with the use of a strap, Velcro, etc. to maintain the sidewall in the gathered orientation. Alternately, as shown in FIG. 10, the retractable sidewalls 140 may be independently lowered/retracted and folded or gathered, and the sidewalls 140 may have a strap 149 or other fastener that can be secured on a mating member 150 of a lower portion of the end portion 142. And, the sidewalls 140 may have an end member 151 that is secured to the end portion 142. Accordingly, since either or both of the first and second sidewalls 140 can be lowered/retracted, the housing assembly 26 can form a four-walled cavity (both sidewalls and both end walls in a wagon mode), a three-walled cavity (both end walls and one sidewall in a bench mode) or a two-walled cavity (both end walls and no sidewalls (i.e., both sidewalls in the retracted/lowered position) in a flatbed mode). A cup holder 143 may be provided in the end portions 142 of the housing assembly 26 as shown in FIGS. 13 and 14. Further, as shown in FIG. 13, a magnet 180 may be sown into the end portion 142 of the flexible housing 26 at the first end of the wagon 10. The magnet 180 is used to magnetically engage the stem of the handle 38 to retain the handle 38 in the up position.

In one embodiment, the bottom wall 144 of the housing assembly 26 may have an opening 160 through which the tab 138 extends (see FIGS. 6-9) to allow for collapsing of the wagon frame 14. In an alternate preferred embodiment, as shown in FIG. 10, rather than an opening 160, the bottom wall 144 may have a pull handle 139 connected to the bottom wall 144. Additionally, the bottom wall 144 of the housing assembly 26 may have a series of rigid inserts or panels 162 integrated thereto, including by sewing into pockets in the bottom wall 144 of the housing assembly 26. A variety of panel 162 configurations may be provided. As shown in the embodiment of FIG. 6, six panels 162 are provided. Similarly, in the embodiment of FIG. 8, four panels 162 are provided to provide rigidity to the floor of the housing assembly 26. The bottom wall 144 of the housing assembly 26, including the rigid panels in the housing assembly 26, generally rest on the first and second floor assemblies 20, 22 when the wagon 10 is in the open/use configuration.

It is also understood that the wagon 10 may be operated without a housing assembly 26. In this orientation, the wagon frame 14 would provide structure for hauling whatever the user desired.

As shown in the embodiment of FIG. 10, the frame assembly 14 may have receivers 164 for receiving canopy poles 166 for a canopy for the wagon 10. The receivers 164 can be openings 164 provided in the vertical members 30, 32, 40, 42 of the first and second end assemblies 16, 18. Alternately, the receivers 164 can be provided in the cross members 36, 46 or in the seat backs.

With reference to FIGS. 6, 8 and 10, to fold the wagon the center brace 90 is lifted in a generally vertical direction. To this end, the tab 138 (FIGS. 6 and 8) may be attached to the center brace 90 and may extend through the opening 160 in the bottom wall 144 of the housing assembly 26. Alternately, a connector (not shown) on the bottom of the bottom wall 144 of the housing assembly 26 may be connected to the center brace 90, and the handle 139 (FIG. 10) may be connected to a top surface of the bottom wall 144 of the housing assembly 26. When the handle 139 is lifted, the center brace 90 will correspondingly be lifted as well, via the connector extending from the bottom wall that is connected to the center brace 90, to begin the collapsing process as described herein. Specifically, as the center brace 90 is lifted, assuming a sufficient force is applied to overcome the resistance of the snap receiver 172 or central clamp member 136 on the brace 168, the first and second floor assemblies 20, 22 will pivot upwardly about their connection between their first end members 72, 82 and the vertical members 30, 32 and 40, 42, of the respective end assemblies 16, 18, and the second end of the floor assemblies 20, 22 connected to the center brace 90 will pivot vertically. Additionally, as the first and second floor assemblies 20, 22 are lifted upwardly the first and second linkages 100, 106 of the linkage assembly 24 will pivot about the pivot connection 118 at the second end 104, 110 end of the first and second linkages 100, 106, as well as pivoting about the vertical members 30, 32 at the first end 102, 108 of the first and second linkages 100, 106. This occurs as the first and second end assemblies 16, 18 move inwardly toward the center of the wagon 10 as shown in FIGS. 3 and 4. Further, as the wagon 10 is folded, the front wheels assemblies 50 rotate, thereby providing clearance for nesting of the rear wheels 64 in the folded configuration. When the center brace 90 has been transitioned upwardly as far as it can move, the wagon 10 is generally in the fully folded configuration of FIGS. 3 and 4. Additionally, the handle 38 may have telescoping capabilities and it may be reduced in length before or after the wagon 10 is folded. To lock the wagon 10 in the folded configuration an over-center locking mechanism may be employed among the various components.

To unfold the wagon 10, a user may grasp the first and second end assemblies 16, 18 and pull them apart from one another, which tends to extend the wagon 10 in the longitudinal direction and causes the center brace 90 to move downwardly to place the first and second floor assemblies 20, 22 back in the generally horizontal orientation. When the wagon reaches the unfolded configuration, the center brace 90 engages the central clamp member 136 on the linkage assembly 24 to retain the first and second floor assemblies 20, 22 in the lower/open/use position.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A foldable wagon, comprising:
a frame having a first end assembly and an opposing second end assembly;
a handle connected to the first end assembly;
a floor assembly comprising a first floor assembly pivotally connected to the first end assembly, and a second floor assembly pivotally connected to the second end assembly, the first floor assembly pivotally connected to the second floor assembly;
a linkage assembly connected to the first end assembly and the second end assembly, the linkage assembly having a first linkage pivotally connected to the first end assembly, a second linkage pivotally connected to the second end assembly, and wherein the first linkage is also pivotally connected to the second linkage; and,
a flexible housing over a portion of the frame, wherein the foldable wagon is moveable between an open configuration and a folded configuration, wherein the linkage assembly is positioned below the floor assembly in both the open configuration and the folded configuration, and wherein the floor assembly moves in a first plane extending between from the first end assembly and the second end assembly during a transition of the foldable wagon from the open configuration to the folded configuration.

2. The foldable wagon of claim 1, further comprising a center brace pivotally connecting the first floor assembly and the second floor assembly.

3. The foldable wagon of claim 1, wherein the first end assembly comprises first and second vertical members, and wherein the second end assembly comprises first and second vertical members.

4. The foldable wagon of claim 1, wherein the linkage assembly comprises a two bar linkage.

5. The foldable wagon of claim 4, wherein the linkage assembly is v-shaped.

6. The foldable wagon of claim 1, wherein the floor assembly moves in a first plane, wherein the linkage assembly moves in a second plane, and wherein the first and second planes are perpendicular.

7. The foldable wagon of claim 1, further comprising a receiver extending from the linkage assembly, the receiver releasably engaging the floor assembly.

8. The foldable wagon of claim 1, further comprising a front wheel assembly connected to the first end assembly.

9. The foldable wagon of claim 1, further comprising a rear wheel assembly connected to the second end assembly.

10. The foldable wagon of claim 1, wherein the flexible housing has a first sidewall, a second sidewall, a first end wall and a second end wall, the first sidewall, second sidewall, first end wall and second end wall forming a wagon enclosure, and wherein the first sidewall is retractable.

11. The foldable wagon of claim 10, wherein the second sidewall is retractable.

12. The foldable wagon of claim 10, wherein the frame of the foldable wagon does not comprise a sidewall in a plane perpendicular to the floor assembly in the open configuration.

13. A foldable wagon, comprising:
a frame having a first end assembly, an opposing second end assembly, and a floor assembly, the frame converting from an open configuration to a folded configuration, wherein the floor assembly comprises a first floor assembly pivotally connected to the first end assembly, and a second floor assembly pivotally connected to the second end assembly, the first floor assembly pivotally connected to the second floor assembly, and wherein the first floor assembly and the second floor assembly move in a plane between the first end assembly and second end assembly during transition from the open configuration to the folded configuration;
a linkage assembly pivotally connecting the first end assembly to the second end assembly in both the open configuration and the folded configuration;
a receiver extending from the linkage assembly, the receiver releasably engaging the floor assembly; and,
a housing over a portion of the frame, wherein the housing has a first sidewall, a second sidewall, a first end wall and a second end wall, the first sidewall, second sidewall, first end wall and second end wall forming a wagon enclosure.

14. The foldable wagon of claim 13, wherein the housing is made of a flexible material.

15. The foldable wagon of claim 13, wherein the floor assembly moves in a first plane during conversion of the frame from the open configuration to the folded configuration, wherein the linkage assembly moves in a second plane during conversion of the frame from the open configuration to the folded configuration, and wherein the first and second planes are perpendicular.

16. A foldable wagon, comprising:
- a frame having a first end assembly, a second end assembly opposing the first end assembly, and a floor assembly, wherein the frame converts from an open configuration to a folded configuration, and wherein the frame has a first side and a second side;
- a handle connected to the first end assembly; and,
- a linkage assembly pivotally connecting the first end assembly to the second end assembly in both the open configuration and the folded configuration, the linkage assembly having a first linkage pivotally connected to the first side of the first end assembly, and a second linkage pivotally connected to the first side of the second end assembly, wherein the linkage assembly is not directly connected to the second side of the frame, and wherein the first linkage is also pivotally connected to the second linkage.

17. The foldable wagon of claim 16, wherein the floor assembly comprises a first floor assembly pivotally connected to the first end assembly, and a second floor assembly pivotally connected to the second end assembly, the first floor assembly pivotally connected to the second floor assembly.

18. The foldable wagon of claim 17, wherein the floor assembly moves in a first plane during conversion of the frame from the open configuration to the folded configuration, wherein the linkage assembly moves in a second plane during conversion of the frame from the open configuration to the folded configuration, and wherein the first and second planes are perpendicular.

19. The foldable wagon of claim 16, further comprising a receiver to removably secure the floor assembly to the linkage assembly in the open configuration.

* * * * *